US007028677B2

(12) United States Patent
Martin

(10) Patent No.: US 7,028,677 B2
(45) Date of Patent: Apr. 18, 2006

(54) EXTERNAL DRIVE SUPERCHARGER

(76) Inventor: Allen L. Martin, 4624 E. Aire Libre, Phoenix, AZ (US) 85032

( * ) Notice: Subject to any disclaimer, the term of this patent is extended or adjusted under 35 U.S.C. 154(b) by 0 days.

(21) Appl. No.: 10/657,318

(22) Filed: Sep. 8, 2003

(65) Prior Publication Data

US 2005/0016509 A1 Jan. 27, 2005

Related U.S. Application Data

(62) Division of application No. 09/627,037, filed on Jul. 27, 2000, now Pat. No. 6,615,809.

(51) Int. Cl.

*F02B 33/00* (2006.01)
*F16H 7/08* (2006.01)
*F16H 7/00* (2006.01)

(52) U.S. Cl. ...................... 123/559.1; 474/110; 474/84

(58) Field of Classification Search ............ 123/559.1; 416/236 R, 240 A; 474/84, 133, 110; 417/362; 15/83

See application file for complete search history.

(56) References Cited

U.S. PATENT DOCUMENTS

| | | | | |
|---|---|---|---|---|
| 124,131 | A | 2/1872 | Hagerty | 474/135 |
| 148,808 | A | 3/1874 | Cleves | 474/133 |
| 235,018 | A | 11/1880 | Poullain et al. | 474/252 |
| 664,505 | A | 12/1900 | Richards | 474/135 |
| 1,286,482 | A | 12/1918 | Yoder | 474/135 |
| 2,835,238 | A | 5/1958 | Oehrli | 123/559.1 |
| 2,917,935 | A | 12/1959 | Haug | 474/84 |
| 3,590,791 | A | 7/1971 | Roosa | 123/559.1 |
| 4,028,955 | A | 6/1977 | Fisher et al. | 474/238 |
| 4,149,497 | A | 4/1979 | Zeliszkewycz | 123/533 |
| 4,216,679 | A | 8/1980 | Howerton et al. | 474/238 |
| 4,369,020 | A | 1/1983 | Rahnke | 417/64 |
| 4,583,962 | A * | 4/1986 | Bytzek et al. | 474/133 |
| 4,653,349 | A | 3/1987 | Kaneyuki | 475/153 |
| 4,770,549 | A | 9/1988 | Rokkaku et al. | 384/492 |
| 4,773,895 | A | 9/1988 | Takami et al. | 474/238 |
| 4,815,428 | A | 3/1989 | Bunk | 123/559.1 |
| 4,896,734 | A | 1/1990 | Horiuchi et al. | 123/559.1 |
| 4,913,690 | A | 4/1990 | Di Giacomo et al. | 474/250 |
| 4,934,837 | A | 6/1990 | Kawamura | 384/492 |
| 5,020,971 | A | 6/1991 | Greenspan | 416/204 A |
| 5,060,622 | A | 10/1991 | Suzuki | 123/559.1 |

(Continued)

FOREIGN PATENT DOCUMENTS

DE 40 11 818 A1 10/1991

(Continued)

OTHER PUBLICATIONS

Dr. Eng. W.T. Von Der Nuell, Superchargers and Their Comparative Performance, Society of Automotive, Jan. 14-18, 1952 New York city, NY, USA.

*Primary Examiner*—Thai-Ba Trieu
(74) *Attorney, Agent, or Firm*—Ellis & Venable PC

(57) ABSTRACT

An external drive supercharger is described. The external drive supercharger includes an impeller, a multibelt pulley adapted to a drive source, an impeller pulley drivingly coupled to the impeller, and an external drive belt having at least one rib coupled to the multibelt pulley to drive the impeller pulley. Further, the external drive assembly includes an adjustable idler engagingly connected to the external drive belt wherein the impeller pulley and the multibelt pulley engage with the at least one rib of the external drive belt.

4 Claims, 9 Drawing Sheets

U.S. PATENT DOCUMENTS

| | | | | | |
|---|---|---|---|---|---|
| 5,112,281 | A | * | 5/1992 | Minato et al. | 474/84 |
| 5,152,027 | A | * | 10/1992 | La Boda | 15/83 |
| 5,176,581 | A | * | 1/1993 | Kumm | 474/110 |
| 5,224,459 | A | | 7/1993 | Middlebrook | 123/559.1 |
| 5,302,157 | A | | 4/1994 | Ogura et al. | 474/166 |
| 5,308,291 | A | | 5/1994 | Robertson et al. | 474/205 |
| 5,334,107 | A | | 8/1994 | White | 474/238 |
| 5,368,004 | A | | 11/1994 | Mann | 123/559.1 |
| 5,415,592 | A | | 5/1995 | Hoyt | 474/85 |
| 5,423,304 | A | | 6/1995 | Lawrence et al. | 123/559.1 |
| 5,522,667 | A | | 6/1996 | Miyake | 384/492 |
| 5,704,862 | A | | 1/1998 | Janne et al. | 474/238 |
| 5,851,635 | A | | 12/1998 | Di Giacomo et al. | 474/248 |
| 5,887,576 | A | | 3/1999 | Wheeler, Jr. et al. | 123/559.1 |
| 5,911,211 | A | | 6/1999 | Uchida | 123/559.1 |
| 5,971,721 | A | * | 10/1999 | Carstensen | 417/362 |
| 6,012,436 | A | | 1/2000 | Boutcher | 123/559.1 |
| 6,082,340 | A | * | 7/2000 | Heimark | 123/559.1 |
| 6,129,510 | A | * | 10/2000 | Martin | 123/559.1 |
| 6,318,346 | B1 | * | 11/2001 | Martin | 123/559.1 |
| 2002/0182063 | A1 | * | 12/2002 | Edsinger | 123/559.1 |

FOREIGN PATENT DOCUMENTS

| | | | | | |
|---|---|---|---|---|---|
| DE | 42 26 550 | A1 | | 2/1994 | |
| JP | 357183523 | A | | 11/1982 | |
| JP | 403168329 | A | | 7/1991 | |
| JP | 404050432 | A | | 2/1992 | |
| JP | 405106457 | A | | 4/1993 | |
| JP | 05272494 | A | * | 10/1993 | 416/236 R |
| JP | 406058158 | A | | 3/1994 | |

* cited by examiner

EXTERNAL DRIVE SUPERCHARGER

This application is a division of Ser. No. 09/627,037 filed Jul. 27, 2000, now U.S. Pat. No. 6,615,809.

FIELD OF THE INVENTION

The present invention relates to the field of mechanically driven centrifugal air compressors or superchargers ("hereinafter collectively referred to as "superchargers").

BACKGROUND

A mechanically driven centrifugal air compressor or supercharger is typically mounted to a drive source, such as an internal combustion engine of a vehicle, that is remote from the drive source's crankshaft. Compressors or superchargers typically have an impeller, a volute chamber housing, and a drive configuration. These superchargers are mounted to a drive source or engine in order to increase the performance of the drive source or engine by forcing more air into the combustion chambers of the drive source. Since conventional impellers for superchargers are typically not very efficient for processing air, these conventional superchargers need to be operated at relatively higher speeds (rotations per minute (RPM's)) to achieve an output air pressure that is constant as possible over a wide speed range for the engine or drive source. However, the pressure of the outputted air for these conventional superchargers achieved over the wide speed range is still not very constant (i.e. may fluctuate dramatically) or is not very good.

Information relevant to attempts to address these various problems can be found in U.S. Pat. Nos. 2,835,238; 4,369,020; 5,224,459; 5,887,576 and 6,012,436. But each of these references suffers from one or more of the following disadvantages listed below.

The mechanical drive between the crankshaft and the supercharger is typically provided by a drive belt and pulley configuration wherein a generally smaller supercharger pulley is overdriven by a generally larger crankshaft pulley. But, the initial overdrive speed ratio that is derived from the primary drive configuration (i.e. belt drive and pulley configuration) is not sufficient to drive the impeller at a high enough speed for a more constant air pressure output. Therefore, gear up configurations or secondary overdrive components are provided by superchargers to further increase the speed of the impeller. Typically, an additional gear driven (i.e. gear to gear configuration) overdrive assembly is provided within the supercharger the supercharger housing to further increase or step up the output of the impeller. U.S. Pat. Nos. 2,741,234, 5,423,304 and 5,425,345 disclose examples of such gear to gear step up configurations for superchargers. These patents are incorporated by reference herein.

For example, conventional superchargers may require the impeller to be overdriven at a relatively high ratio in order to reach rotational impeller speeds in excess of 65,000 RPM. The reason the supercharger is being operated at such high speeds is because of the inefficient prior impeller designs. Also, air sealing at the gap between the impeller and the volute chamber housing needs to exist for more optimal operation of the supercharger. Typically, conventional impellers are positioned between a gap of 0.015 to 0.017 inch from the air sealing area of the volute chamber housing, and therefore, these impellers need to be rotated and driven at high speeds in order to provide a tighter air seal between the impeller and the air sealing area of the volute chamber housing. Further, conventional superchargers are not machined with high tolerances to provide for precision positioning between the parts, and it is therefore needed and desired to provide a supercharger that has precision made and/or high tolerance parts. It is also needed and desired to provide and use more precisely made and positioned supercharger parts having higher tolerances in order to achieve air sealing at the gap, especially if the impeller is to be rotated and driven at relatively lower speeds.

Other various problems and disadvantages exist with previous superchargers, impellers, and gear up configurations. The extremely relatively high speed at which a conventional impeller must be driven creates a large amount of friction and heat within the supercharger and its respective parts. These superchargers also tend to heat the air while it is being compressed thereby resulting in the output of hotter air by the supercharger. The heated air is less dense and is, therefor, less efficient than cooler air for increasing drive source or engine performance. Therefore, intercoolers have been used in conjunction with conventional superchargers to reduce the heat. Cooler air is desired since it is denser than hotter air in order to achieve the same results. Typically, conventional superchargers output higher pressurized air (i.e. ten pounds per square inch (10 psi)) because of the higher speeds at which the impeller is rotated, and the higher pressurized outputted air may cause stress and/or damage to the impeller and/or throttle components. Since the output of the supercharger is of relatively high pressure, flutter or pre-ignition of the drive source or engine may occur when the throttle is opened and closed due to the build up of reserved pressure in the output of the supercharger. Valves or waste gates have been provided to eliminate or reduce the build up of reserve air pressure. Special electronic or computer control components or fuel management systems may be necessary to regulate the manner in which the engine or drive source responds to the air pressure fluctuations and/or air density fluctuations. Therefore, in overcoming the above problems and disadvantages of operating the supercharger at relatively high speed, it is highly desired and needed to achieve better air sealing at the gap, especially if the impeller is to be rotated and driven at relatively lower speeds.

Also, the gear driven (i.e. gear to gear configuration) overdrive assembly contained within the supercharger housing typically includes at least one relatively heavy, large gear in order to achieve the necessary gear up ratio. The heavy, large gear, therefore, increases the overall size and weight of the supercharger since the housing would have to be made large enough to house the heavy large gear. Also, these gear driven overdrive assemblies typically use oil within the housing to lubricate the gears and bearings, and the oil further adds to the overall weight of the supercharger and the oil also retains heat within the supercharger.

Further, the impeller and the meshing of the overdrive gears while rotating at extremely high speeds may cause a considerable amount of friction, heat and noise to be produced. Since the impeller must be rotated at extremely high speeds and because the conventional drive components are relatively large and heavy, a substantial amount of inertia exists and must be overcome to drive and operate the supercharger and its respective components at extremely high speeds. Also, the existence of inertia within the drive configuration causes stresses and wear and tear on its respective components including the drive belts. The inertial forces are most pronounced during acceleration and deceleration, especially where these forces are uncontrolled. The power losses related to overcoming the forces of inertia results in decreased engine performance. Therefore, it is desired and needed to provide a supercharger that has a drive configuration that reduces or eliminates frictional contact, heat and inertia. Attempts have also been made to develop less noisy centrifugal superchargers by incorporating plastic gears within the overdrive gear assemblies. U.S. Pat. Nos. 5,423,304 and 5,425,345 disclose examples of such superchargers. These patents are incorporated by reference herein. However, such superchargers that attempt in overcoming the noise problem still require extremely high impeller speeds and thereby create substantial gear friction which may result in premature gear failure. Therefore, it is also desired and needed to provide a supercharger that has a drive configuration that reduces or eliminates noise but does not contribute to gear friction and/or gear failure.

External drives are known to produce relatively low speeds and low flow in contrast to internal drive mechanisms for superchargers. Superchargers having an internal drive source are known but external drive sources are easier to install. For example, inventor's previously filed U.S. patent application Ser. No. 09/185,898 discloses internal drive superchargers and is hereby incorporated by reference.

Therefore, there is a need for high speed and high flow external drive superchargers. The present invention discloses and provides a supercharger that overcomes the above problems, disadvantages and limitations.

SUMMARY

It is an object of the present invention to provide an external drive supercharger that provides increased flow and higher pressures. The external drive assembly for use with an impeller of a supercharger of this invention comprises a multibelt pulley adapted to receive a drive source; an impeller pulley drivingly coupled to the impeller, an external drive belt having at least one rib coupled to the multibelt pulley to drive the impeller pulley; an adjustable idler engagingly connected to the external drive belt; wherein the impeller pulley and the multibelt pulley engage with the at least one rib of the external drive belt. Preferably, the adjustable idler is spring loaded. More preferably, an internal drive assembly directly couples the impeller pulley to the impeller.

In a preferred embodiment, the external drive belt is selected from the group consisting of serpentine belts, polydrive belts and toothed belts. Preferably, the multibelt pulley engages at least the external drive belt and a motor belt. More preferably, the multibelt pulley wherein the multibelt pulley is adapted to an existing engine component. Most preferably, the multibelt pulley is mounted on a drive shaft of the an existing engine component.

Also the external drive belt preferably has at least two ribs. More preferably the external drive belt has between 3 and 7 ribs if the ribs have only a longitudinal component. The adjustable idler may preferably used to set the tension of the external drive belt. More preferably the adjustable idler is spring loaded. The multibelt pulley is connected to a connected to a single shaft and preferably has space for at least the motor belt and the external drive belt. More preferably the multibelt pulley has at least two sets of engaging ribs connected to a single shaft.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION

Figure 1:
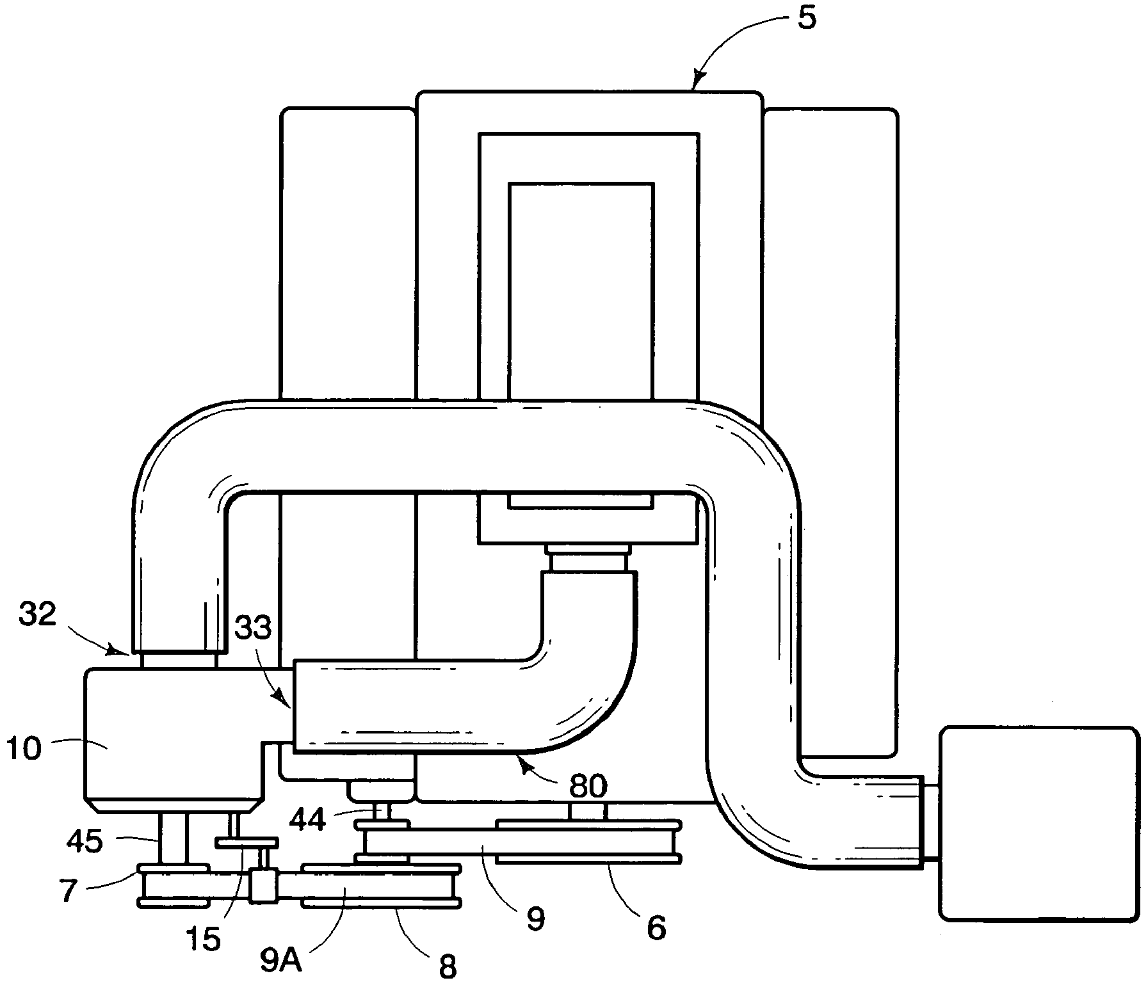
FIG. 1 is a top view of a preferred embodiment of the present invention supercharger coupled to a drive source or engine.
Figure 1A:
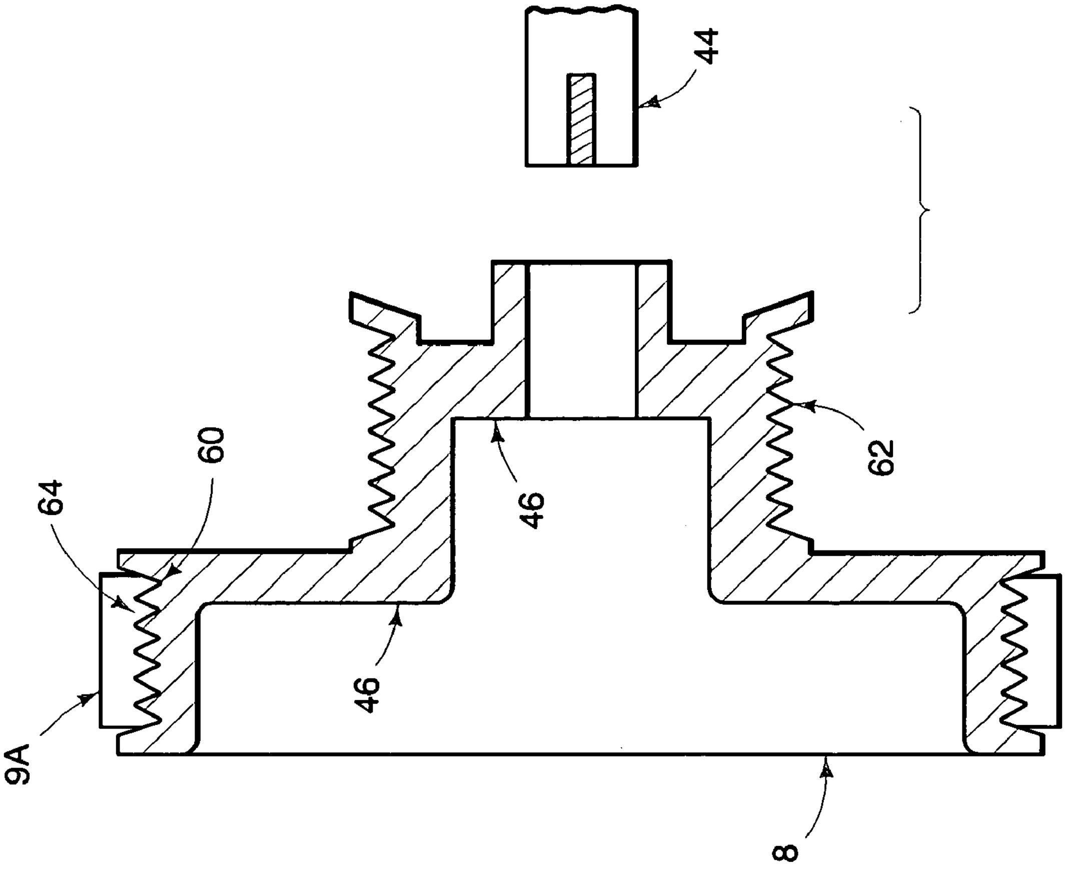
FIG. 1*a* is a cross-sectional view of a preferred embodiment of a multibelt pulley and an external drive belt.
Figure 9:
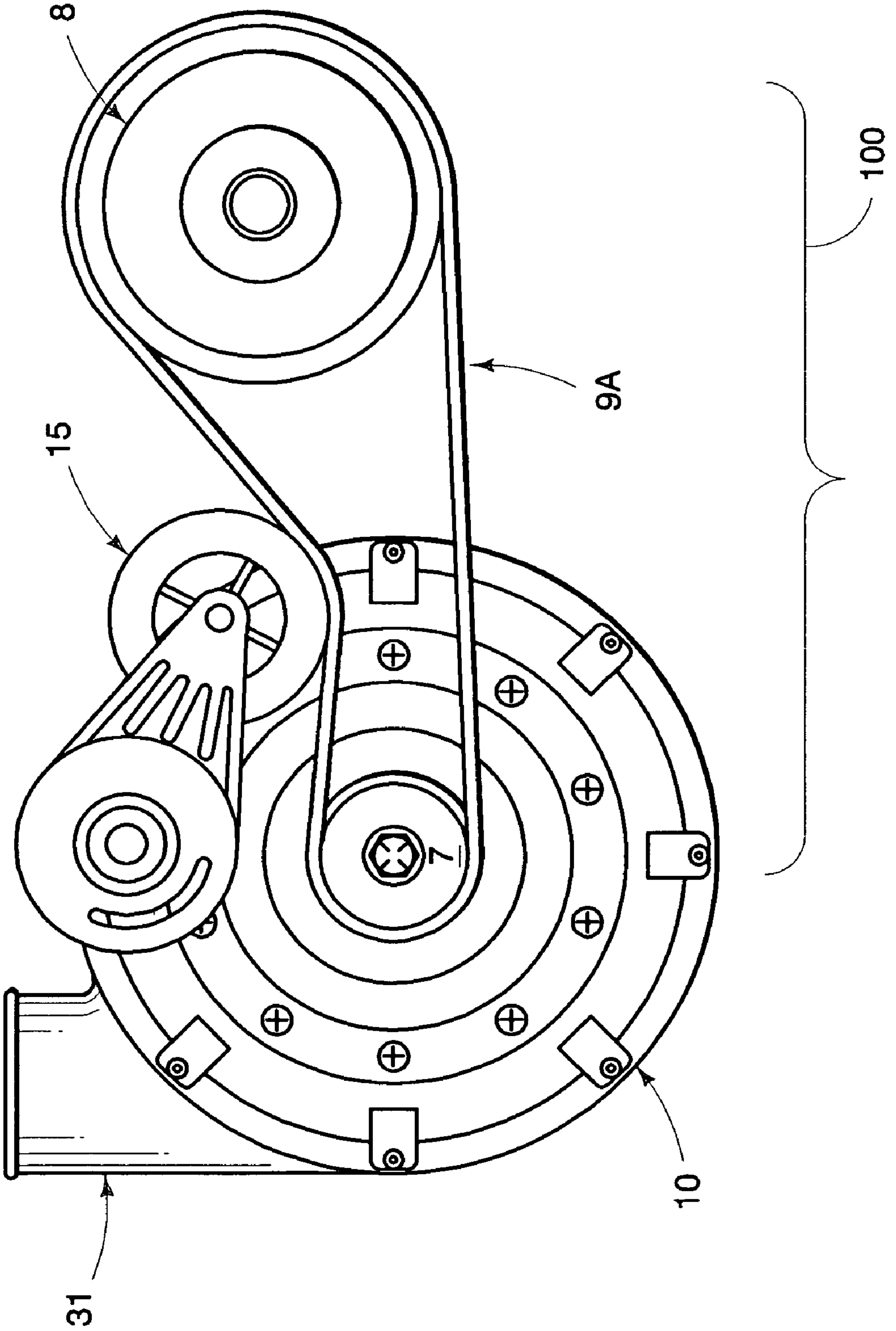
FIG. 9 is a front perspective view of a preferred embodiment of the present invention supercharger showing a preferred embodiment of the external drive assembly components.

The present mechanically driven supercharger has an impeller 20 and an external drive assembly 100 (see FIGS. 1 and 9). The supercharger 10 is shown mounted to and driven by a drive source 5, for example, an internal combustion engine such as in FIG. 1. The supercharger 10 forces more air into the combustion chamber(s) of the engine to improve performance and efficiency. As an example, the impeller pulley 7 may be adaptively coupled to the drive source 5 through the motor pulley 6 and the motor belt 9. Preferably, as shown in FIG. 1, the motor belt 9 is coupled through a multibelt pulley 8 and an external drive belt 9A. A preferred embodiment of the multibelt pulley is shown in FIG. 1*a*. The multibelt pulley 8 is mounted to a rotatable shaft 44, and preferably replaces a pulley of an already existing engine component, such as the alternator pulley, etc. Preferably, the multibelt pulley 8 has space for at least one motor belt 9 and the external drive belt 9A. The motor belt 9 may be any kind of belt used to drive other engine components such as an alternator. Preferably, the motor belt 9 is either a serpentine or polydrive belt. Preferably, the external drive belt has at least one rib, and more preferably has at least two ribs. The at least one rib of the external drive belt 9A may be selected from the rib(s) having longitudinal components only, transverse components only and rib(s) having a combination of longitudinal and transverse components. Preferably, an idler 15 contacts the back of the external drive belt 9A and creates tension in the external drive belt 9A.

Figure 2:
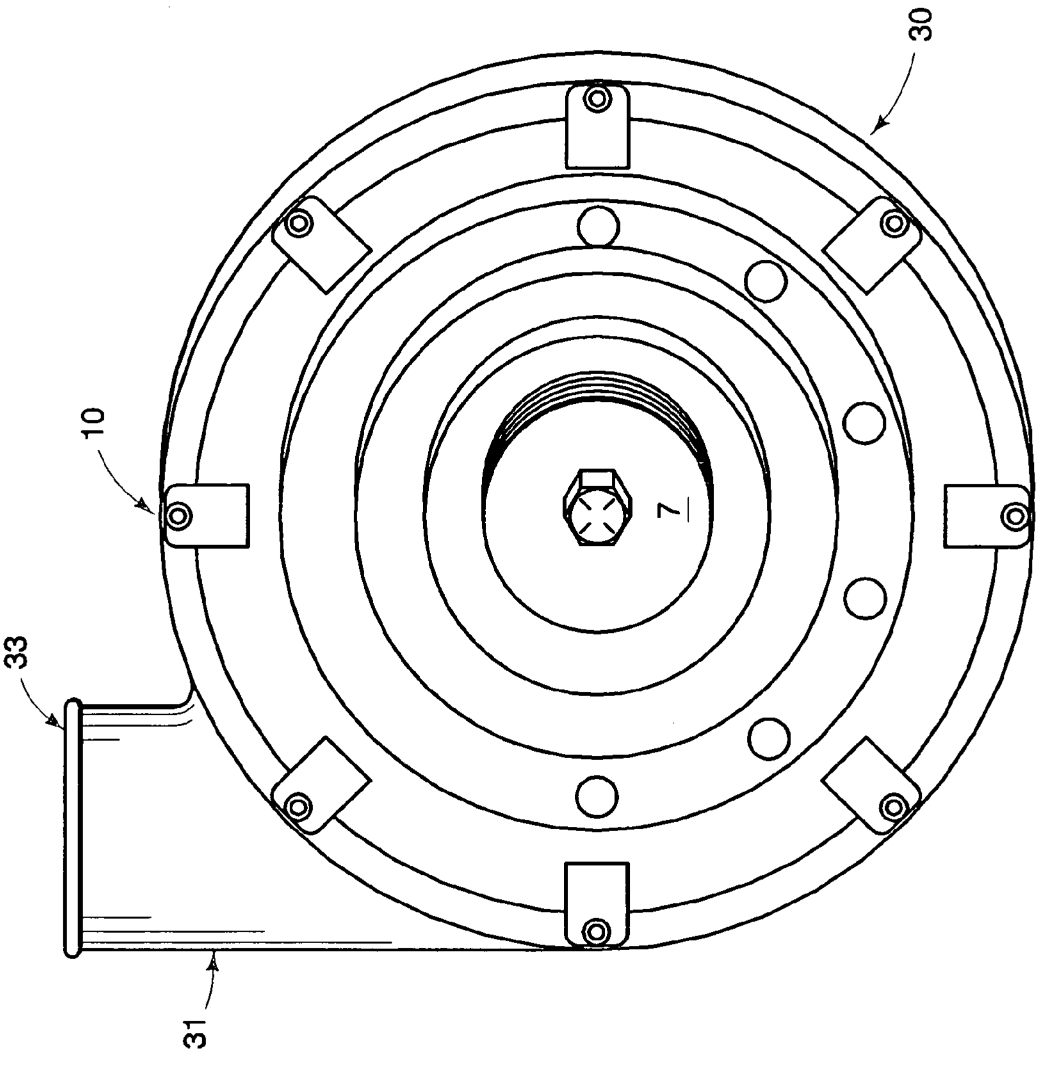
FIG. 2 is a front perspective view of a preferred embodiment of the present invention supercharger.
Figure 3:
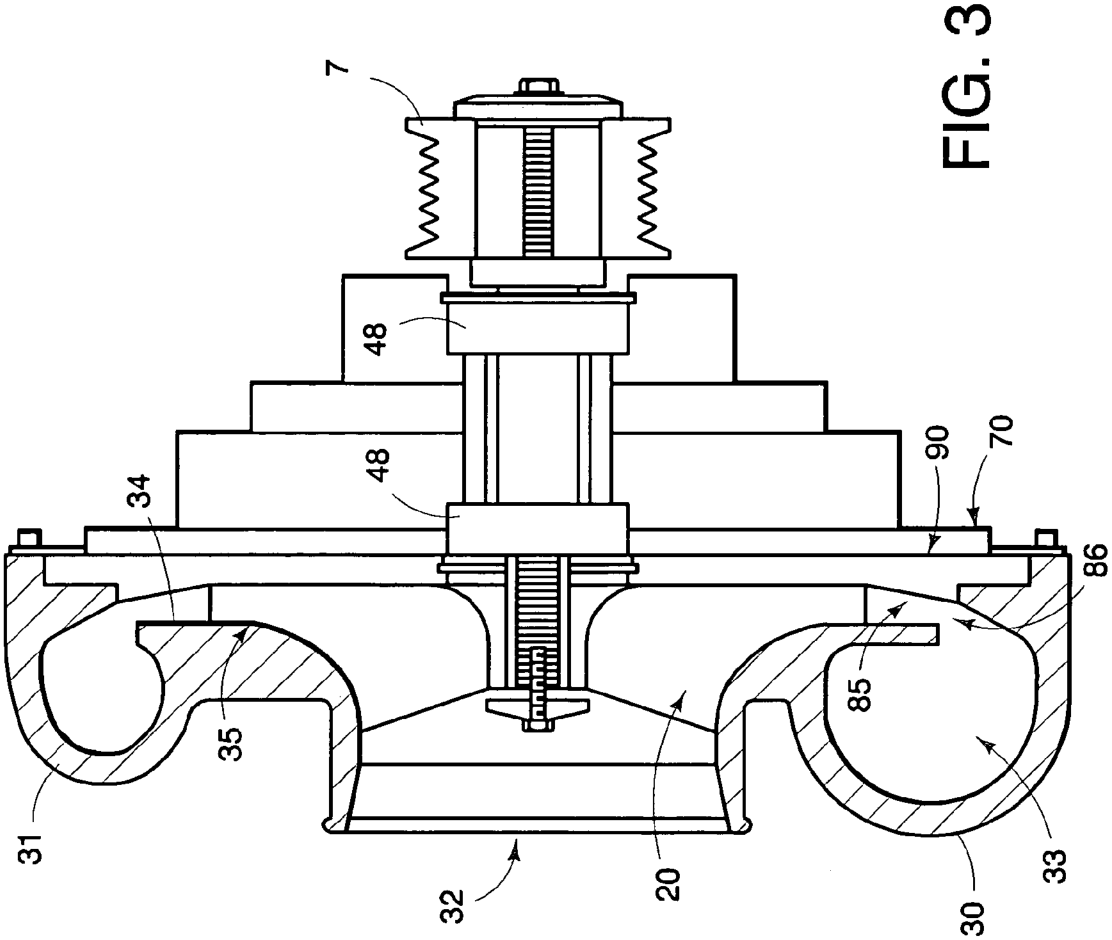
FIG. 3 is a side cross-sectional view of one preferred embodiment of the present invention supercharger.
Figure 4:
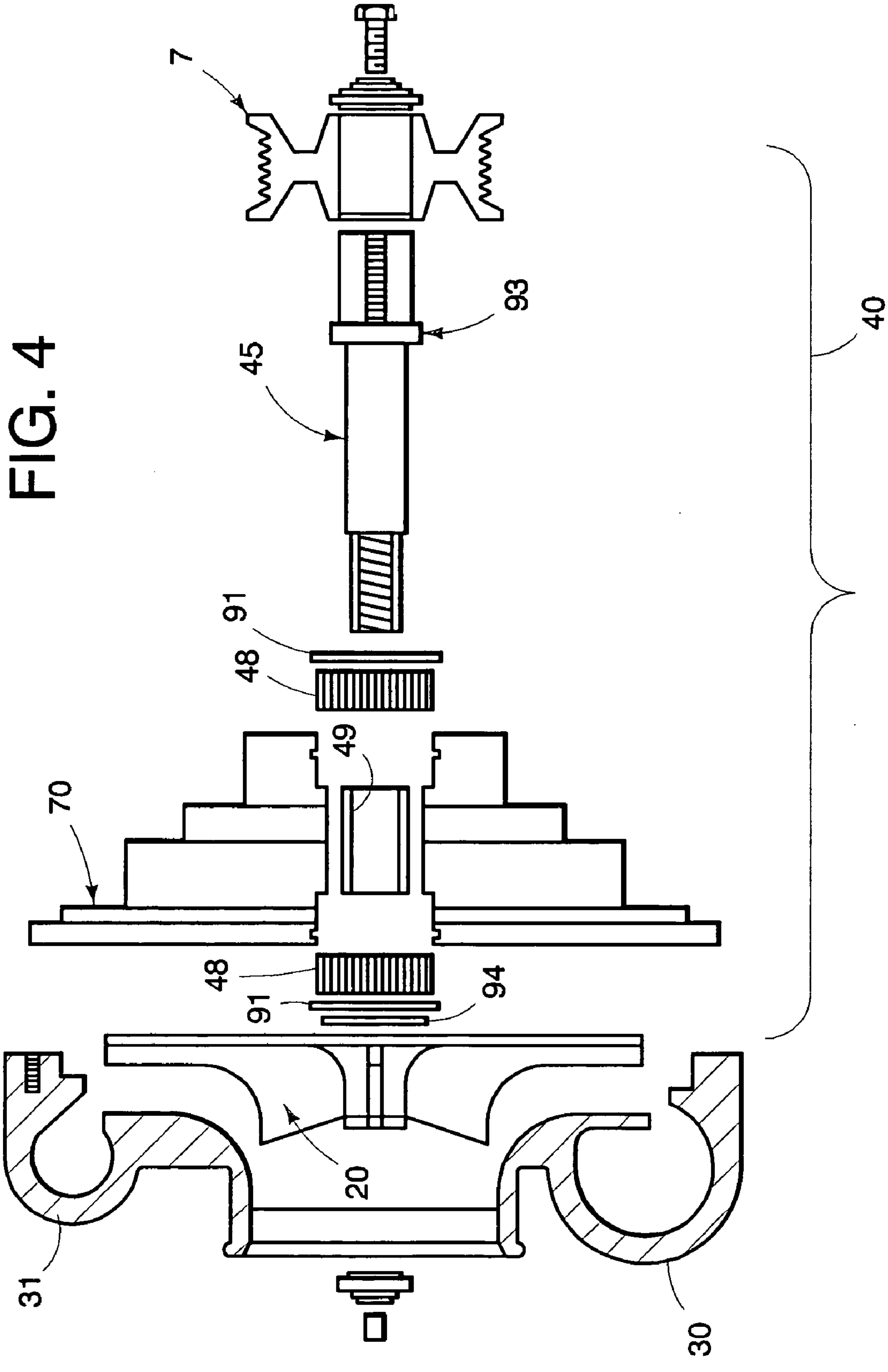
FIG. 4 is an exploded side cross-sectional view of another preferred embodiment of the present invention supercharger.

FIGS. 2, 3, and 4 show various views of the supercharger 10 in its entirety. FIGS. 3 and 4 show the various parts of the supercharger 10. The supercharger 10 generally has an impeller 20, a volute chamber housing 30, an internal drive assembly 40, and a drive assembly mount 70. The impeller 20, volute chamber housing 30 and drive assembly mount 70 may be made of steel, aluminum or composite materials such as plastics.

Figure 5:
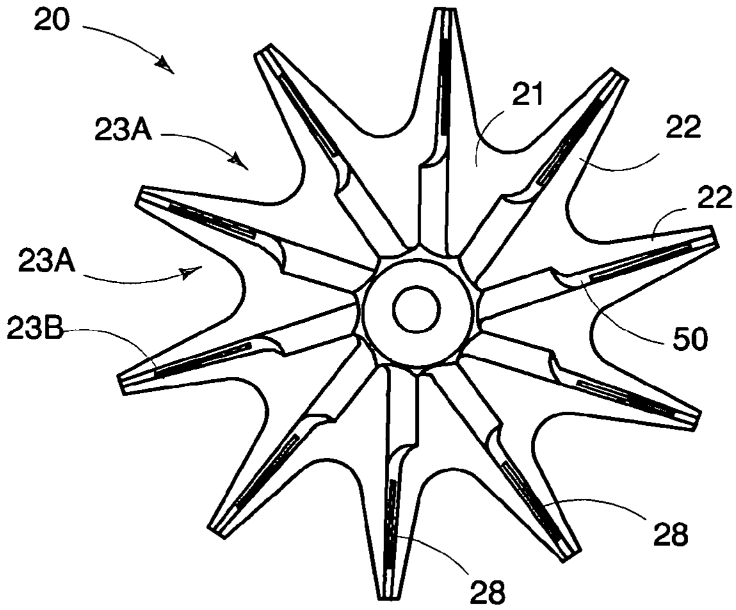
FIG. 5 is a top view of the impeller for a preferred embodiment of the present invention supercharger.
Figure 6:
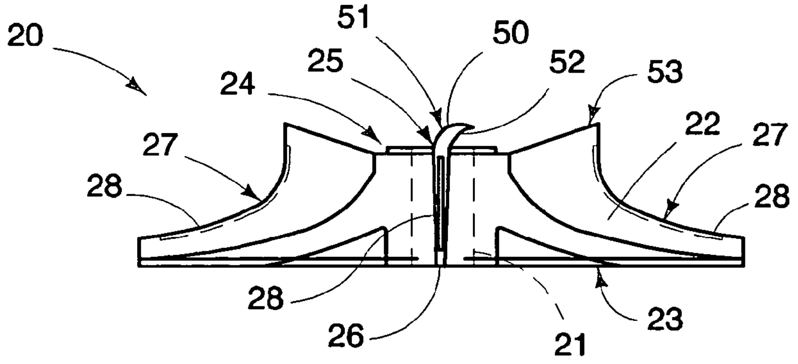
FIG. 6 is a side view of the preferred embodiment of the impeller of FIG. 5.

FIGS. 5 through 8 show specific views of the impeller 20. The impeller 20 for the supercharger 10 generally has a body 21 and precision made air vanes 22. The body has a base 23 and an air intake end 24. The base 23 provides a wide support area while the air intake end 24 is a narrower portion at the top of the impeller 20. The base 23 is preferably star shaped and has a number of notched out areas 23A. The notched out areas 23A reduce the mass of the impeller and inertial forces related thereto. The surfaces 23B of the notched out areas 23A further create more air flow within the volute chamber housing 30 when the impeller 20 is being driven and rotated. The body 21 is adapted to mount to the internal drive assembly 40 of the supercharger 10, and the internal drive assembly 40 is able to drive and rotate the body 21. Precision made air vanes 22 are attached to or made integral with the body 21 as shown in the figures. The precision made air vanes 22 each extend from the base 23 to the air intake end 24. Referring to FIGS. 5 and 6, the outer edge surface of each precision made air vane provides an air sealing surface 27 for the impeller 20.

Figure 7:
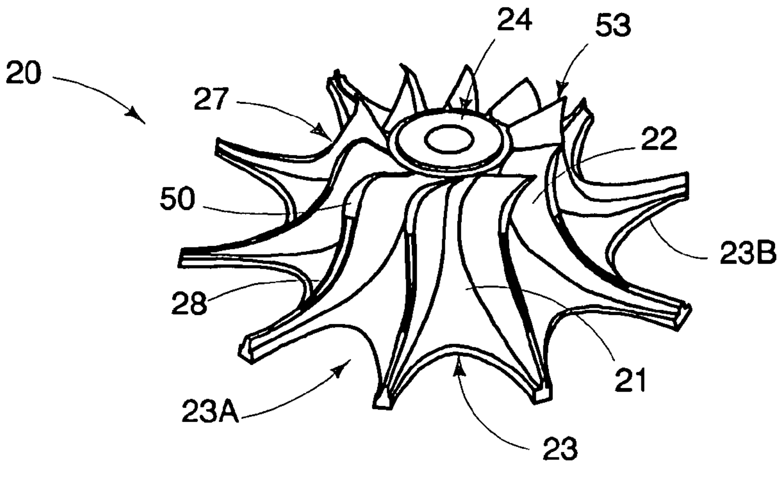
FIG. 7 is a perspective view of the preferred embodiment of the impeller of FIG. 5.

An air foil 50 may be attached to or made integral with each of the precision made air vanes 22 near the air intake end 24 of the body 21. FIGS. 5, 6, and 7 show that the air foil 50 is a curved portion, and the curved portion creates air pressure differences between outer area 51 and inner area 52 of each air foil 50. The air pressure differences augment the flow drawing of air into the volute chamber housing 30 when the body 21 is being rotated. At least a portion 53 of the air foil 50 extends above the air intake end 24 of the body 21 so that a vortex action is created thereat. The vortex action allows a greater volume of air to enter through the air intake opening 32 of the volute chamber housing 30 (i.e., see FIGS. 3 and 8). Also, FIG. 6 shows that the precision made air vanes 22 are made to have thicker walls 25 towards the air intake end 24 of the body 21 and thinner walls 26 towards the base 23. Further, FIGS. 5 and 6 show each precision made air vane 22 preferably having at least one groove 28 located along each air sealing surface 27. More details of the air sealing surface 27 and the at least one groove 28 will be provided later in the specification.

Figure 3A:
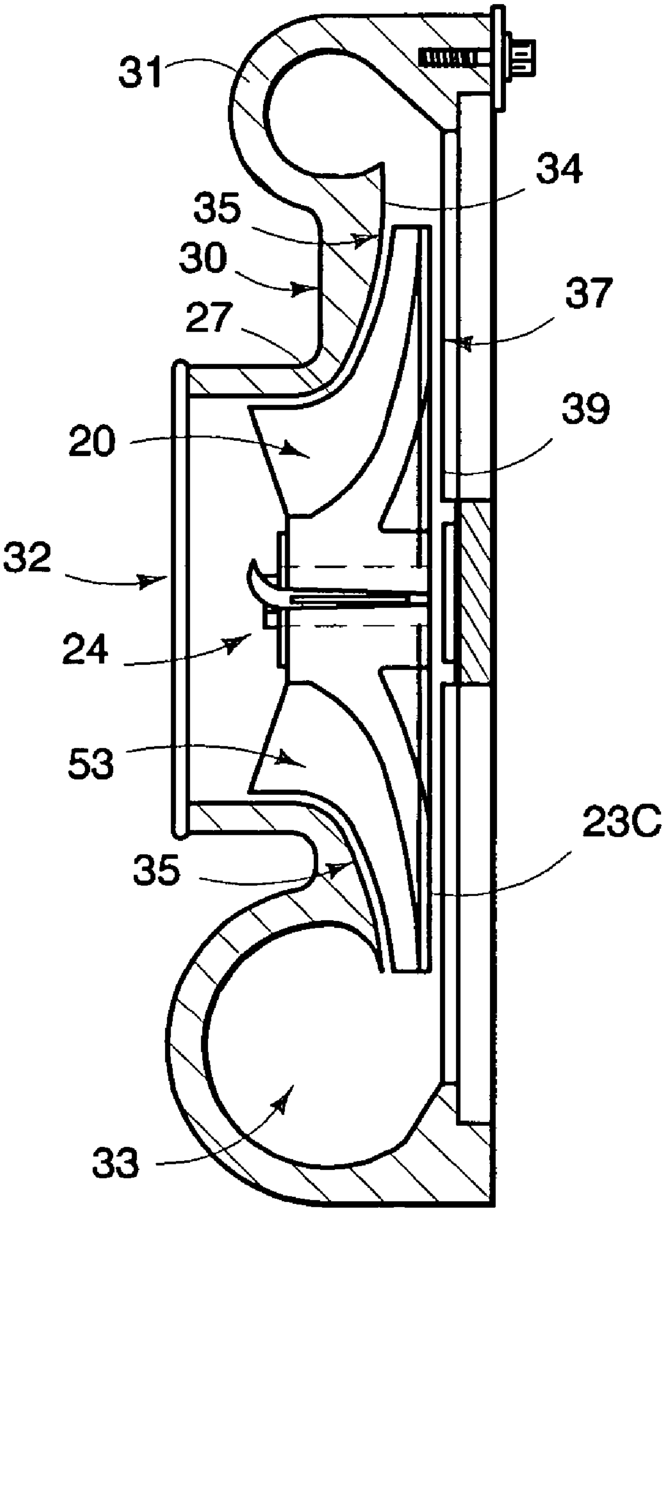
FIG. 3*a* is a detailed side cross-sectional view of a preferred embodiment of the impeller fitted to the precision made inner area of the volute chamber housing for a preferred embodiment of the present invention supercharger.
Figure 8:
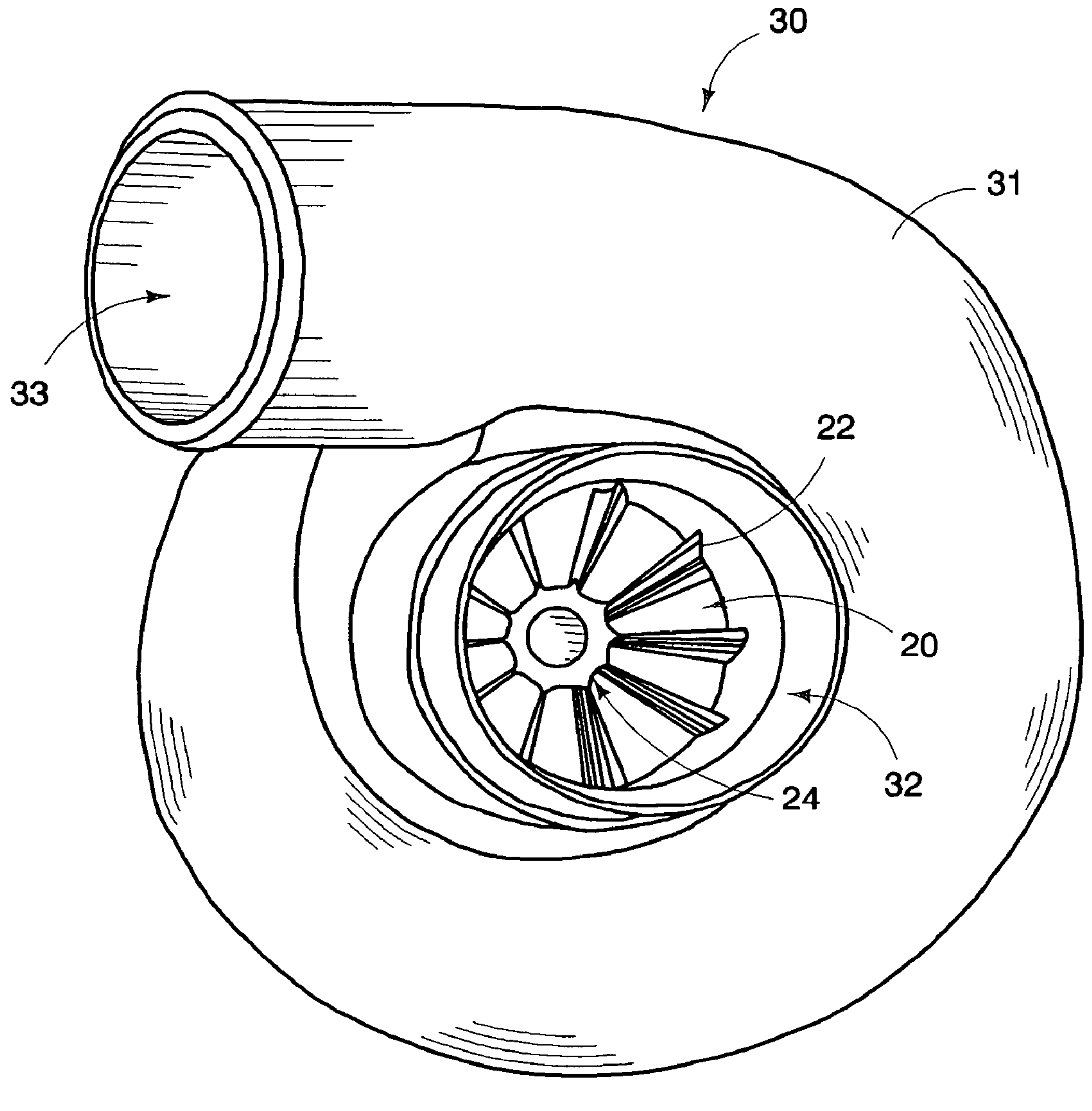
FIG. 8 is a rear perspective view of the volute chamber housing and the impeller for a preferred embodiment of the present invention supercharger.

The impeller 20 is positioned within the volute chamber housing 30 (i.e., see FIGS. 3 and 8). Referring to FIGS. 3, 3A, 4, and 8, the volute chamber housing 30 generally has a chamber body 31, an air intake opening 32, an air output opening 33, and a precision made inner area 34. FIGS. 3, 3A and 8 show the positioning of the precision made air vanes 22 and the body 21 relative to the volute chamber housing 30. The precision made air vanes 22 have air sealing surfaces 27 as discussed above. The air sealing surfaces 27 are precisely spaced a small gap distance 35 relative to the precision made inner area 34 of the volute chamber 30 as shown in FIG. 3A. Optimal performance of the supercharger 10 is achieved by precisely and as closely as possible spacing the air sealing surfaces 27 relative to the inner area 34, that is, the gap distance 35 is made as small and as precise as possible to provide precise air sealing therebetween. An air sealing effect is created at the gap distance 35 when the impeller 20 is being driven and rotated. In a preferred embodiment, the at least one groove 28 on each of the air sealing surfaces 27 further creates air pockets which help to further provide an air sealing effect when the impeller 20 is being driven and rotated. Also, an air sealing effect is created at the gap distance 37 between the base air sealing surface 23C of the base 23 and the volute chamber base surface 39 when the impeller 20 is being driven and rotated. Precise air sealing results in less pressure losses for the supercharger 10. Therefore, the impeller 20 is able to be rotated at a slower speed (i.e., lower RPMs) compared with conventional prior impellers in order to generally achieve the same level of performance. The precise air sealing and the providing of air foils 50 on the vanes 22 causes the supercharger 10 to produce a flow of air at more of a constant pressure over a wider impeller speed (RPM) range than conventional superchargers. Conventional superchargers typically provide an air sealing gap distance of fifteen to seventeen thousandths of an inch (0.015" to 0.017"). The preferred embodiment of this supercharger 10 is so precisely made and machined to provide air sealing gap distances 35 and 37 that are at most five thousandths of an inch (0.005") and eight thousandths of an inch (0.008") respectively.

In another preferred embodiment the precision made inner surface area 34 and a compressing surface 85 create an air compression outlet 86 to the air output opening 33 to increase the output pressure. The compressing surface may be integral to the base surface or separate. Preferably, a compression ring 90 as shown in FIG. 3 forms the compressing surface. The compression ring 90 is preferably made out of steel, aluminum, or other composite materials such as plastics.

FIGS. 3, 4, and 9 show various views and parts of the internal drive assembly 40 for supercharger 10. FIG. 3 shows the impeller 20 coupled to the internal drive assembly 40. The internal drive assembly 40 drives and rotates the impeller 20. The internal drive assembly 40 generally has an impeller pulley 7 that is driven by an external drive belt 9A having at least one rib. More preferably the external drive belt 9A has at least two ribs. Preferably, the external drive belt 9*a* is selected from the group consisting of polydrive and serpentine and toothed belts. Suitable examples of external drive belts include, but are not limited to: Gates Polyflex JB belts, Gates Micro-V belts and Gates toothed belts, such as those described in U.S. Pat. Nos. 4,233,852 and 4,337,056.

The impeller pulley 7 is typically made from steel, aluminum or composite materials. The impeller pulley 7 is adapted to couple to a drive source 5. The impeller pulley 7 is coupled to the impeller 20. The external drive belt 9A is coupled to the impeller pulley 7 and the multibelt pulley 8 so that the external drive belt 9A is driven by the multibelt pulley 8 which, in turn, is driven by the motor belt 9 and the motor pulley 6. In the preferred embodiment, the impeller pulley 7 and the portion of the multibelt pulley 8 coupled to the drive belt 9A are cylindrically shaped wheels with each having at least one groove 60 and 62 around their perimeter edge. An example of a preferred embodiment is shown in FIGS. 1*a* and 9. Preferably, the number of grooves 60 and 62 of the impeller pulley 7 and the portion of the multibelt pulley 8 coupled to the drive belt 9A are equivalent. Also, the pulleys 7 and 8 may contain recessed areas 46 to reduce weight of these pulleys and inertial forces related thereto. FIGS. 1*a* and 9 show the external drive belt 9A with ribs 64, and the external drive belt is shown engaged to the pulleys 7 and 8 as shown in these figures. Preferably, the multibelt pulley 8 which is connected to the external drive belt 9A is larger in diameter than the impeller pulley 7 in order to provide a gear up ratio (i.e., overdrive gear ratio). For example, the preferred gear up ratio for the present pulleys 7 and 8 is at least 3 to 1 and may typically be 5 to 1 or higher. However, the gear up ratio for conventional prior art superchargers is typically much greater. Preferably, the surfaces of the impeller pulley 7 and the multibelt pulley 8 are cryogenically treated and/or hand anodized to strengthen the pulleys and to provide a non-porous surface for each of these pulleys. The non-porous surfaces of pulleys 7 and 8 provide a very smooth surface resulting in less friction when engaged to the external drive belt 9A thereby resulting in longer life for the external drive belt 9A.

In an alternative embodiment, the impeller pulley 7 and, at least the portion of the multibelt pulley 8 coupled to the drive belt 9A, have engaging teeth for coupling a drive belt 9A, which is toothed.

The present invention includes an adjustable idler 15 to engage the back of the external drive belt 9A. Preferably the idler engages at least the back of the external drive belt 9A. Preferably, the adjustable idler may be a spring loaded to regulate the tension more evenly during operation. Most preferably the spring loaded adjustable idler 15 provides between 30 and 50 pounds-force of tension.

Referring to FIGS. 4 and 9, the external drive assembly 100 is adapted to the drive source and drivingly coupled to the impeller. A preferred embodiment includes an impeller shaft 45 and a drive shaft 44. Shafts 44 and 45 may both be made hollow in order to reduce weight of these parts and inertial forces related thereto. The hollow drive shaft 44 may be adaptively coupled to the multibelt pulley 8. Alternatively, the multibelt pulley 8 may be made out of one or more pieces that are couple together. The impeller shaft 45 is coupled to the impeller pulley 7 and to the impeller 20 and a drive assembly mount 70. For example, FIG. 1 shows a preferred embodiment where the drive source or engine 5 has a motor pulley 6 and a motor belt 9. The motor belt 9 couples the motor pulley 6 to the multibelt pulley 8. The external drive belt 9A couples the multibelt pulley 8 to the impeller pulley 7. The impeller pulley 7 is thereby driven and rotated by the rotating motor belt 9 and motor pulley 6 which in turn rotates the multibelt pulley 8 and the external drive belt 9A, and the impeller pulley 7, in turn, drives the impeller 20.

Referring to FIGS. 3 and 4, two impeller bearing assemblies 48 are coupled to the hollow impeller shaft 45 and fitted to the drive assembly mount 70 to create the internal drive assembly 40. A bearing spacer 49 creates a specific distance between the impeller bearing assemblies 48 and allows the impeller shaft 45 to pass through. The bearing assemblies 48 reduce friction between shaft 45 and the drive assembly mount 70. The bearing assemblies 48 are, in this preferred embodiment, sealed bearings that do not require the use of oil or other lubricants for operation. The impeller shaft 45 generally rotates at a greater speed than the drive source shaft 44. Preferably the bearing assemblies 48 may have precision ceramic ball bearings in order to provide longer life and durability and to withstand frictional stress and heat. In a most preferred embodiment, the bearing assemblies use Teflon seals, have aluminum or plastic ball retainer races and are composed of 8, 9 or 10 ceramic ball bearings. Preferably the bearing spacer 49 provides at least a one thousandth of an inch preload clearance on both sides drive assembly mount 70.

The internal drive assembly preferably maintains an acceptable sealing gap distances 35 and 37. In a preferred embodiment shown in FIG. 4, a bearing spacer 49, bearing assemblies 48, locking rings 91, shaft shoulder stop 93, and spacing ring 94.

FIGS. 3 and 9 show various internal drive assembly and external drive assembly parts such as the impeller pulley 7, the multibelt pulley 8, the external drive belt 9A, impeller shaft 45, and impeller bearing assembly 48 coupled to the drive assembly mount 70.

The impeller 20 of FIGS. 3 and 4 is placed on and coupled to the impeller shaft 45. The supercharger 10 generally operates by rotating the impeller pulley 7. The impeller pulley 7 drives and rotates the shaft 45, and shaft 45 drives and rotates the impeller 20. Referring to FIGS. 3 and 8, when the supercharger 10 is in operation as just described, air is drawn by rotating the impeller 20 into the air intake opening 32 and the volute chamber housing 30. The air becomes pressurized as the impeller 20 in combination with the volute chamber 30 acts upon it. The air is forced out of the volute chamber 30 through the air output opening 33 under a constant pressure (i.e., greater than atmospheric pressure). The generally constant pressurized air is directed through duct 80 to the air intake of the engine or drive source 5.

The present supercharger 10 provides at least the key advantages of being able to operate at lower speeds (RPMs), provides a more constant pressure throughout a wider impeller and engine/drive source speed (RPM) range, and outputs cooler and more dense air than conventional prior art superchargers. Furthermore, the present supercharger 10 does not require use of larger and heavier gears and is able to be quieter since there are no direct gear to gear contact. The present supercharger 10 is also easier to operate since it does not require the use of internal belts or of additional oils or other such lubricants in order to operate. Further, even though the present supercharger 10 can be operated up to at least 50,000 rpm, the present supercharger 10 is more efficient and may be operated at lower speeds (RPMs). Overall, since the present supercharger 10 is operated at lower speeds (RPMs), then less stress and wear and tear is placed on its parts and the supercharger 10 does not generate as much heat and is able to operate at lower temperatures than conventional superchargers. Further, the present supercharger is easier to install and maintain because it has an external drive assembly.

The preferred embodiment of the invention is described above in the Drawings and Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method of making a supercharger comprising the steps of:

providing an impeller having a body with a base and an air intake end and further having precision made air vanes attached to the body wherein the precision made air vanes each extends from the base to the air intake end and wherein the precision made air vanes have air sealing surfaces;

positioning the impeller in a precision made inner area of a volute chamber housing;

precisely spacing the air sealing surfaces of the precision made air vanes relative to the precision made inner area;

coupling an external drive assembly, comprising the secondary overdrive components, directly to the impeller for driving and rotating the impeller; and coupling the external drive assembly to a drive assembly mount.

2. The method of making a supercharger according to claim 1 wherein the coupling the external drive assembly step further comprises the steps of:

providing a multibelt pulley adapted to couple to a drive source;

coupling an impeller pulley to the impeller and to the drive assembly mount, and coupling an external drive belt to the multibelt pulley and the impeller pulley wherein the external drive belt is being driven by the multibelt pulley to drive the impeller pulley.

3. An external drive assembly, having secondary overdrive components, for use with an impeller of a supercharger comprising:

a multibelt pulley adapted to receive a drive source using a motor belt wherein:

1. the multibelt pulley engages at least an external drive belt and a motor belt;
2. the multibelt pulley is adapted to receive a rotatable shaft of an existing engine component; and
3. the multibelt pulley replaces the pulley of the existing engine component;

an impeller pulley drivingly coupled to the impeller;

an external drive belt having at least one rib coupled to the multibelt pulley to drive the impeller pulley wherein the external drive belt is selected from the group consisting of: serpentine belts, polydrive belts or toothed belts;

an adjustable idler engagingly connected to an external drive belt wherein the adjustable idler is spring loaded;

wherein the impeller pulley and the multibelt pulley engage with the at least one rib of the external drive belt.

4. The external drive assembly according to claim 3 further comprising an internal drive assembly for coupling the impeller pulley to the impeller.

* * * * *